C. MacQUOWN & K. W. RUNSER.
METHOD OF MAKING TOOLS.
APPLICATION FILED OCT. 30, 1915.

1,183,474.

Patented May 16, 1916.

WITNESSES
W. T. Holman
Elbert L. Hyde

INVENTORS
Clark MacQuown
and Karl W. Runser,
By Fred W. Winter

UNITED STATES PATENT OFFICE.

CLARK MacQUOWN AND KARL W. RUNSER, OF PITTSBURGH, PENNSYLVANIA, ASSIGNORS TO GEM MANUFACTURING COMPANY, OF PITTSBURGH, PENNSYLVANIA, A CORPORATION OF PENNSYLVANIA.

METHOD OF MAKING TOOLS.

1,183,474.   Specification of Letters Patent.   Patented May 16, 1916.

Application filed October 30, 1915.   Serial No. 58,881.

*To all whom it may concern:*

Be it known that we, CLARK MACQUOWN and KARL W. RUNSER, residents of Pittsburgh, in the county of Allegheny and State of Pennsylvania, have invented a new and useful Improvement in Methods of Making Tools, of which the following is a specification.

This invention relates to a method of making edged tools, and more particularly tools in which the cutting edges lie along a reëntrant angle of the blade.

The chisel edges of most tools are made by grinding down the metal at the edge of the tool from one or both faces, which requires the tool to be applied to the grinding implement at an angle and to be held in a definite position in order to secure the proper bevel on the inclined chisel face of the cutting edge. This method is difficult to apply for the production of a chisel edge or edges along a reëntrant angle of the blade, a form of chisel edge found in one common type of weeding tool, because the limited space causes the grinding implement to engage and injure one edge while forming or sharpening the other, and also requires a separate grinding operation for each edge of the tool.

The present invention has for its object to provide a simple method of forming a chisel edge upon a tool which does away with the necessity of holding the blade at a definite angle to the abrading or grinding implement, and which enables the chisel edge to be readily formed, sharpened or resharpened in a reëntrant angle of the tool by a simple operation, and one which enables both edges of the reëntrant angle to be ground simultaneously.

Further objects of the invention are in part obvious and in part will appear more in detail hereafter.

Figure 1:
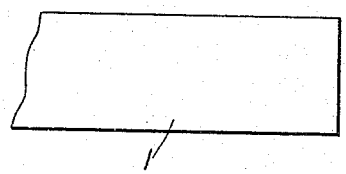
Figure 3:
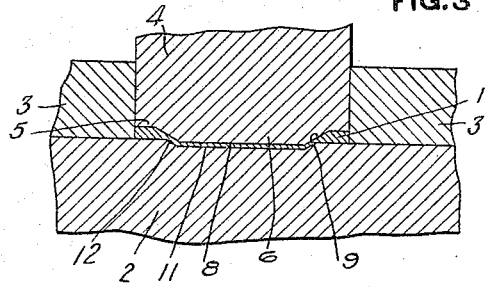
Figure 2:
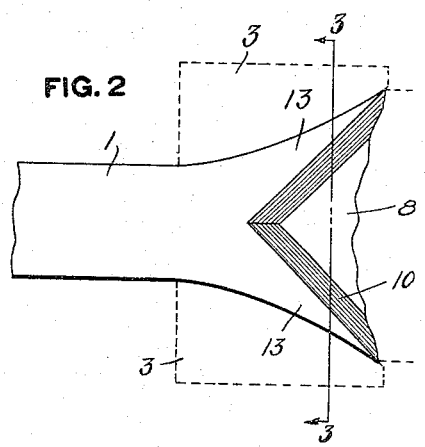
Figure 4:
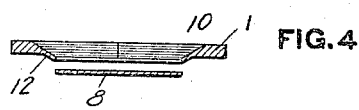
Figure 5:
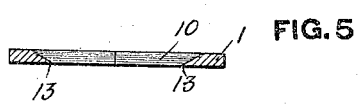
Figure 6:
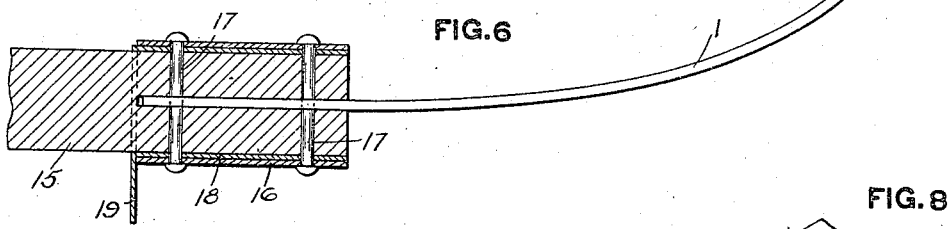
Figure 7:
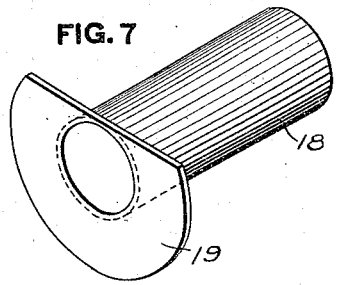
Figure 8:
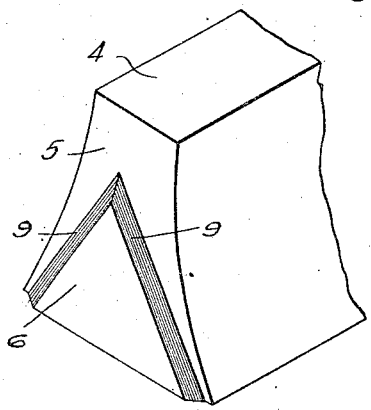

In the drawings, Figure 1 represents a plan view of a blank from which the tool is formed; Fig. 2 is a similar view after the forging operation, and in dotted lines indicating the lateral forming or holding dies; Fig. 3 is a cross sectional view on the line 3—3, Fig. 2, and showing the forming dies; Fig. 4 is a cross sectional view, taken on the same plane as Fig. 3, and illustrating the trimming operation; Fig. 5 is a similar section of the ground or sharpened blank; Fig. 6 is a longitudinal section of the completed weeding implement, showing the blade applied to a staff or handle; Fig. 7 is a detail perspective view, on a larger scale, of a foot rest; and Fig. 8 is a perspective view of one of the forming dies.

Referring to the drawings, the blade of the weeding tool shown is made from a flat strip or sheet 1 of rolled or pressed metal, preferably steel, which is blanked off square at its end. The method of forming the bevel or chisel edges upon this blank comprises essentially three operations, to wit, a forging operation, a trimming operation and a grinding or sharpening operation.

In the first operation the end of the blank is laid upon an anvil 2 above which are located stationary lateral holding or forming dies 3, one on either side of the blade. The blank is forged by a vertically reciprocating hammer or pressing die 4, whose operating face 5 for engaging the upper flat surface of the blank is provided with a V-shaped downwardly extending projection 6, arranged to engage the central portion of the blank and force the metal downwardly and laterally toward both sides of the blade, so as to cause it to flow outwardly toward the lateral holding dies 3, and simultaneously thinning down the central portion of the blank to a thin web, as indicated at 8. The projection 6 is provided with bevel or inclined walls 9 at its sides, whose inclination determines the angle of the bevel face of the chisel edge of the cutting blade being formed. This forging operation works the metal into substantially the final configuration of the cutting blade, leaving it with a rough outline substantially conforming to the curvature of the side holding dies 3, and forming the beveled faces of the chisel edges, as indicated by the shaded portions 10 in Fig. 2, said faces being joined by the thin web 8 before referred to.

In order to enable the sharp cutting edges to be readily completed by a single grinding operation and without injuring said edges, the anvil 2 is preferably provided with a shallow depression 11, lying directly below the projection 6 of the forging die, and which is slightly deeper than the thickness of the thin web 8 remaining after the forging operation. Consequently, at the conclusion of the forging operation the bottom flat face of the projection 6 lies slightly below the upper flat face of the anvil 2, as in Fig. 3, so that the web 8 is entirely below the bottom face of the blank. Also, the side walls of the depression 11 are beveled to correspond to the side walls 9 of the projections 6, so that the substantially triangular web 8 is connected to the body portion of the blank by thin inclined walls along the edges of the reëntrant angle of the blade, as indicated at 12.

The trimming dies will be of any suitable form arranged to trim off the lateral edges of the blank to the desired shape and also sever the thin web 8 from the body of the blank, shearing it off from said blank at the inner edges of the inclined thin walls 12, as indicated in Fig. 4. The trimming operation completely forms the diverging prongs or teeth 13 of the blade except for the removal of the downwardly extending thin walls 12. These thin walls may be removed in any suitable manner, such as by a shearing operation, but preferably are ground off on an emery wheel or other suitable abrading device. They are shown somewhat exaggerated in Figs. 3 and 4, for clearness of illustration, but it will be understood that these thin walls will be merely heavy enough to support the web 8 and will depend below the bottom face of the blank, so that when said blank is ground off down to the plane of its bottom face a sharp chisel edge is produced on each of the cutting edges of the reëntrant angle, as shown at 13, Fig. 5.

The grinding or shearing operation for removing the fins 12 can be carried out effectively because the plane face of the body of the blank forms a guide for determining how far said operation shall proceed. For example, in removing the metal by a grinding operation the flat face of the blank with the walls 12 projecting from one face thereof is passed back and forth over the grinding wheel until a flat surface is formed, which insures the production of a sharp chisel edge along the reëntrant angle. This edge can always be readily renewed by merely grinding a little more of the plane surface, and never requires the blade to be held at a definite angle relative to the grinding tool. Both edges of the reëntrant angle are also provided with chisel cutting edges at one and the same operation, and without liability of injury to either.

The blade of the completed tool is usually curved, as shown in Fig. 6, so as to enable it to be more readily introduced into the soil and passed beneath the root of the weed. It also has some inherent resiliency so that downward pressure is not liable to break the blade but instead tends to force it in a horizontal direction through the root of the weed. The blade can be bent to the proper curved form either before or after the shearing or grinding operation, and at any time, for example, during the trimming operation, may be provided with the necessary holes for rivets or securing means, as will be readily understood.

The tool blade is carried by a suitable staff or handle 15, which is provided with a slot for receiving said blade and is surrounded by a sleeve or collar 16, one or a plurality of rivets or bolts 17 being passed through the sleeve, staff and blade for securing them to each other. Preferably, also, the tool is provided with a suitable rest to which the foot may be applied when forcing the implement into the ground. Said rest may be attached to the staff in any suitable manner, and is shown as a sleeve or collar 18, lying between the staff and collar 16, and having an outwardly extending flange 19 at its upper end, which may be cut off transversely at the front of the tool, as shown in Fig. 7, to enable the cutting portion of the blade to be seen without stooping over.

While in the description we have referred specifically to weeding tools, it will of course be understood that the method may be employed for the manufacture of any kind of cutting tool.

What we claim is:—

1. The method of making tools, consisting in forging the central portion of a strip and thereby thinning its central portion and spreading the metal toward the side portions of said strip to form diverging teeth and depressing or displacing the thinned portion of the metal along the blank diverging edges of the tool outwardly beyond its face, and then removing the outwardly extending metal.

2. The method of making tools, consisting in forging a flat strip between its edges and thereby spreading the metal toward the side portions of the strip to form prongs whose edges form a reëntrant angle and depressing a portion of the metal along the edges of said reëntrant angle outwardly from the plane of the strip, and removing the excess metal projecting outwardly from said plane.

3. The method of making tools, consisting in forging a flat strip between its edges and thereby spreading the side portions of the strip to form prongs whose edges form a reëntrant angle, depressing a portion of the metal along the edges of said reëntrant angle outwardly from the plane of the strip, and shearing or grinding off the excess metal extending outwardly from said plane.

4. The method of cutting edges along reëntrant angles of tools, consisting in depressing a portion of the metal along the blank reëntrant edges of the tool, and removing the excess metal extending outwardly from the plane of the tool along all the reëntrant edges thereof by a single operation.

5. The method of making tools, consisting in forging the central portion of a flat strip and thereby thinning its central portion and spreading the metal toward the side portions of the strip to form diverging teeth, depressing or displacing the thinned portion of the metal along the blank diverging edges of the tool outwardly beyond its face, shearing out the thinned central portion of the strip leaving inclined walls along its diverging edges, and shearing or grinding off the excess metal of said inclined walls extending outwardly from the tool face.

In testimony whereof, we have hereunto set our hands.

CLARK MacQUOWN.
KARL W. RUNSER.

Witnesses:
E. L. HYDE,
GLENN H. LERESCHE.

Copies of this patent may be obtained for five cents each, by addressing the "Commissioner of Patents, Washington, D. C."